(12) United States Patent
Ushiyama

(10) Patent No.: US 6,349,140 B1
(45) Date of Patent: *Feb. 19, 2002

(54) INFORMATION RECEIVING SYSTEM FOR DESCRAMBLING SCRAMBLED INFORMATION AND PRESENTING THE DESCRAMBLED INFORMATION

(75) Inventor: Takao Ushiyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/335,416

(22) Filed: Nov. 3, 1994

(30) Foreign Application Priority Data

Feb. 16, 1994 (JP) .............................. 6-019681

(51) Int. Cl.$^7$ .............................................. H04N 7/167
(52) U.S. Cl. ..................... 380/210; 348/706; 725/31; 725/139
(58) Field of Search ............................ 380/10, 20, 239, 380/240, 241, 242, 210, 200, 211; 348/10, 705, 706; 455/6.2, 4.2; 725/31, 135, 139, 143, 151–153

(56) References Cited

U.S. PATENT DOCUMENTS 4,276,562 A * 6/1981 Stewart et al. ................. 348/8
4,606,072 A * 8/1986 Martin et al. ................. 455/6.2
4,633,309 A * 12/1986 Li et al. ..................... 380/10 X
4,864,613 A * 9/1989 Van Cleave ................. 380/10
5,297,204 A * 3/1994 Levine ........................ 380/10
5,430,799 A * 7/1995 Katznelson ................. 380/15
5,485,198 A * 1/1996 Källström ................. 380/20 X

FOREIGN PATENT DOCUMENTS

EP      0 430 711 A2    6/1991
GB      2 089 623 A     6/1982
GB      2 256 116 A     11/1992

* cited by examiner

Primary Examiner—Gilberto Barron, Jr.
(74) Attorney, Agent, or Firm—Arent Fox Kintner Plotkin & Kahn, PLLC

(57) ABSTRACT

A TV signal that was scrambled and transmitted from a CATV center is tuned by a TV tuner for a parent unit or a TV tuner for a child unit based on a command received from a microprocessor. The tuned TV signal is input to a descrambler provided in the parent unit. The descrambler descrambles the scrambled TV signal. The descrambled TV signal is input to a synthesizing unit for the parent unit or a synthesizing unit for the child unit. When the parent unit or the child unit cannot receive a desired pay channel program, the microprocessor causes a character generating unit to generate a message that indicates that a pay channel program cannot be watched. This message is synthesized with a TV signal by the synthesizing unit for the parent unit or the synthesizing unit for the child unit and then output to a TV receiver of the parent unit or a TV receiver of the child unit.

15 Claims, 14 Drawing Sheets

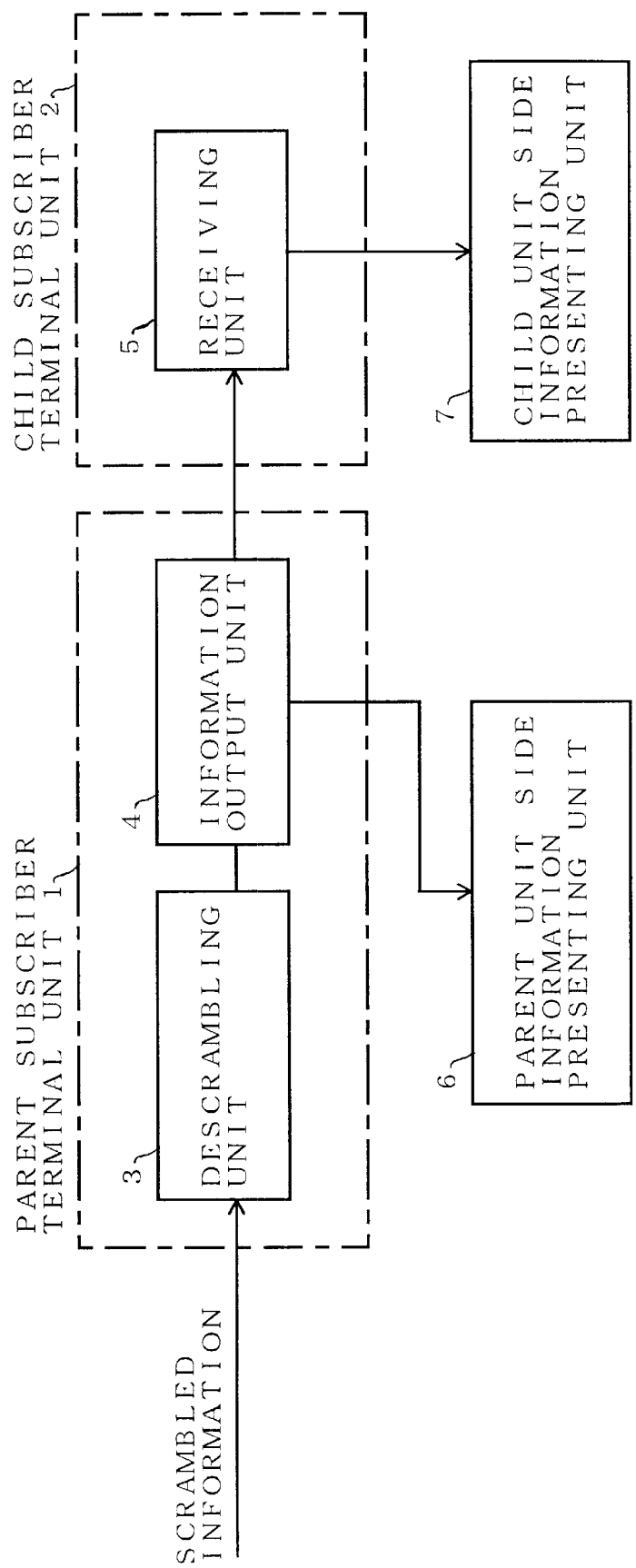
F I G. 3

INFORMATION RECEIVING SYSTEM FOR DESCRAMBLING SCRAMBLED INFORMATION AND PRESENTING THE DESCRAMBLED INFORMATION

BACKGROUND OF THE INVENTION

1. Field of the Invention

The present invention relates to an information receiving system for descrambling scrambled information and presenting the descrambled information.

2. Description of the Related Art

A satellite broadcasting system, which uses a satellite, a CATV (cable television) system, which uses a cable, and so forth have been commercially used as well as the conventional TV (television) broadcasting system, which uses a ground wave. The CATV system provides each subscriber with a subscriber terminal unit. For each subscriber terminal unit, descrambling control, charging process, and so forth are performed.

At present, many families have two or more TV receivers. The users often want to see CATV programs with any TV receiver in their houses. There are several methods to satisfy such needs. FIG. 1 shows one method where a TV signal received from a CATV center is distributed to two subscriber terminal units with a distributor so as to allow the users to see CATV programs with two TV receivers. FIG. 2 shows another method where an RF output terminal of a subscriber terminal unit A is connected to an input terminal of a subscriber terminal unit B so as to receive TV signals transmitted from a CATV center with the two subscriber terminal units.

However, in the above-mentioned methods, the number of subscriber terminal units required must be the same as the number of TV receivers that receive CATV programs or the like. In addition, a number of subscriber contracts are required corresponding to the number of the TV receivers. Even if the contract fee is discounted after the second TV receiver, the users would have to spend a large amount of money. In addition, since the CATV center controls each of subscriber terminal units by transmitting signals with an address number assigned to each of subscriber terminal units. Thus, as the number of subscriber terminal units increases, the processing time of the computer in the CATV center increases.

When a subscriber terminal unit is installed corresponding to each TV receiver, if a user who sees a pay channel program with a TV receiver A, which is connected to a subscriber terminal unit A (see FIG. 1), wants to see the same pay channel program with another TV receiver B in another room, he or she should operate the subscriber terminal unit B connected to the TV receiver B so as to descramble the received signals. In this case, since the CATV center cannot determine whether the same user sees the same pay channel program or another user sees the same pay channel program, it charges for each subscriber terminal unit. Thus, even if the same user continuously sees the same pay channel program with different TV receivers in the same house, the user will be doubly charged for the pay channel program.

SUMMARY OF THE INVENTION

An object of the present invention is to provide an information receiving system having a plurality of subscriber terminal units, all of which is not required to have a descrambling function but each of which can reproduce scrambled information.

Another object of the present invention is to provide an information receiving system for allowing the number of subscriber terminal units controlled by a center to be decreased, thereby reducing the load of the processing performed by the center.

A further object of the present invention is to provide an information receiving system for allowing the user to see pay channel programs with a plurality of TV receivers or the like in the house of the subscriber at a moderate cost.

In an information receiving system for descrambling scrambled information and presenting the descrambled information, a parent subscriber terminal unit according to the present invention comprises a descrambling unit for descrambling scrambled information, and an information output unit for outputting the descrambled information received from the descrambling unit to a parent unit side information presenting unit or a child subscriber terminal unit. Information output from the information output unit comprises image information, sound information, and so forth. A child subscriber terminal unit according to the present invention comprises a receiving unit for receiving the descrambled information from the parent subscriber terminal unit. Information received by the receiving unit is output to a child unit side information presenting unit and presented through images, sound, and so forth.

An information receiving system according to the present invention is, for example, an image information receiving system constructed of a center for transmitting information and a plurality of subscriber terminal units. The parent subscriber terminal unit further comprises a channel signal receiving unit for receiving a channel command signal that represents a desired receive channel of the child subscriber terminal unit, a control unit for controlling the switching of the descrambled information descrambled by the descrambling unit to the child terminal unit or to the parent unit side information presenting unit based on the channel command signal of the child subscriber terminal unit received from the channel signal receiving unit and the desired receive channel of the parent subscriber terminal unit, and a parent unit side information presenting unit for presenting descrambled information descrambled by the descrambling unit through images, sound, and so forth. The child subscriber terminal unit further comprises a channel signal output unit for outputting a channel command signal that represents a desired receive channel of the child unit side information presenting unit to the parent subscriber terminal unit and a child unit side information presenting unit for presenting descrambled information descrambled by the parent subscriber terminal unit through images, sound, and so forth.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a block diagram used to explain a principle of operation of the present invention;

DESCRIPTION OF PREFERRED EMBODIMENT

Figure 1:
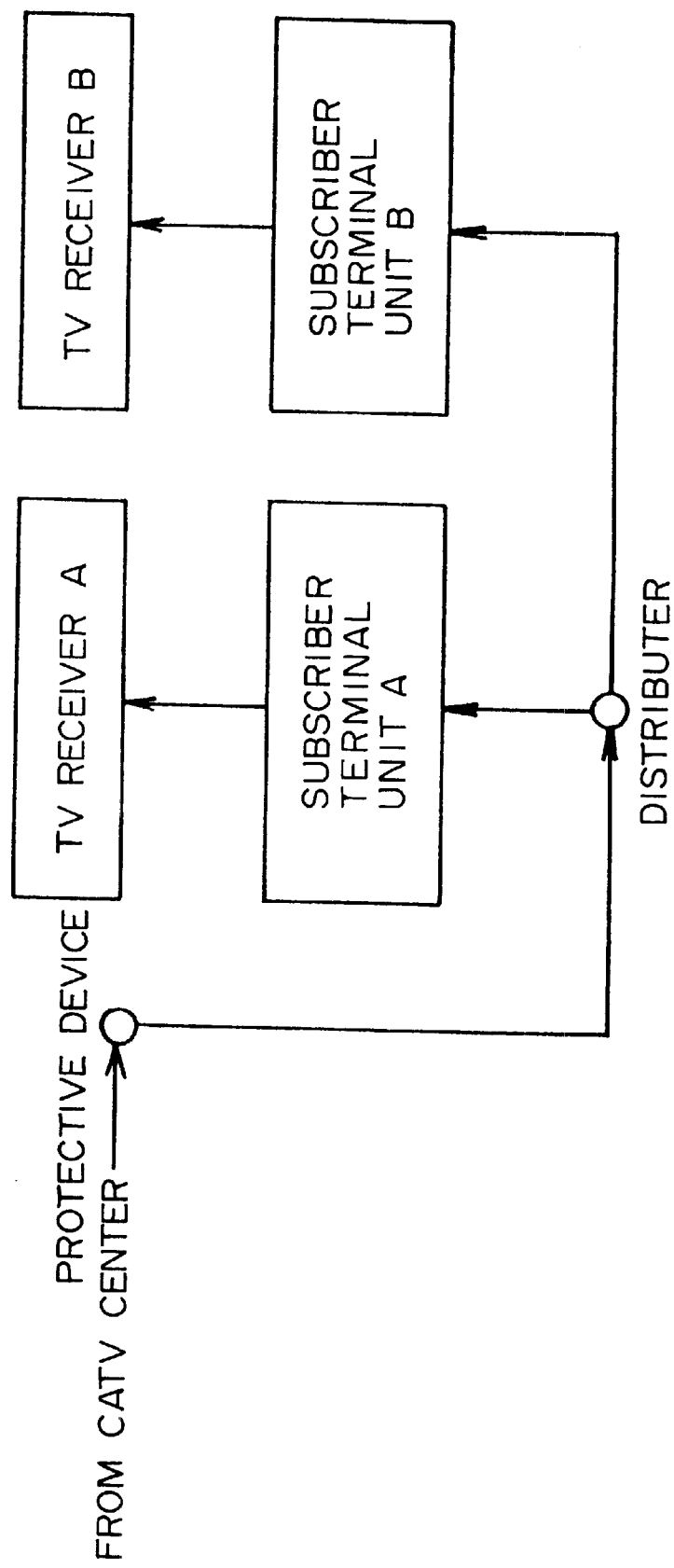
FIG. 1 is a block diagram for explaining a conventional receiving system with a distributor that distributes pay channel programs to two TV receivers.
Figure 2:
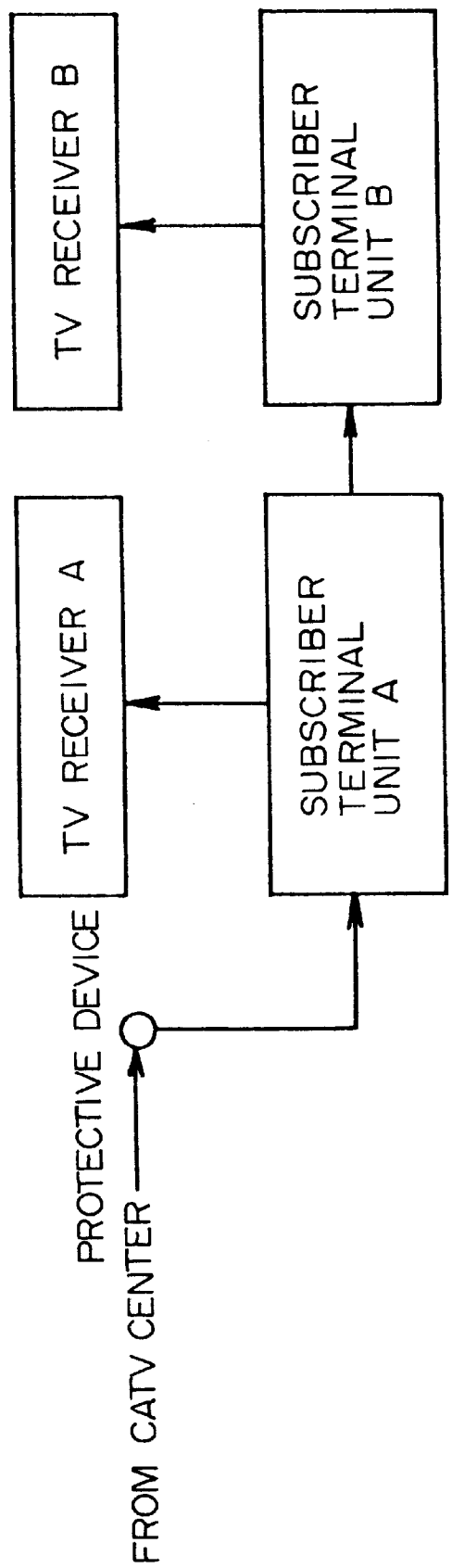
FIG. 2 is a block diagram for explaining a conventional receiving system with RF output terminals that distribute pay channel programs to two TV receivers.

FIG. 3 is a block diagram showing the principles of operation of the present invention. In an information receiving system for descrambling scrambled information and presenting the descrambled information, a descrambling unit 3 of a parent subscriber terminal unit 1 according to the present invention descrambles scrambled information.

An information output unit 4 outputs information descrambled by the descrambling unit 3 to, for example, a parent unit side information presenting unit 6 or a child subscriber terminal unit 2. The information that is output from the information output unit 4 is, for example, image information (TV signal, or the like), sound information, or the like.

A receiving unit 5 of the child subscriber terminal unit 2 receives descrambled information from the information output unit 4 of the parent subscriber terminal unit 1. The information received by the receiving unit 5 is output to, for example, a child unit side information presenting unit 7. The child unit side information presenting unit 7 presents image information, sound information, and the like.

The information receiving system is, for example, an image information receiving system that comprises a center and a plurality of subscriber terminal units. The parent subscriber terminal unit 1 and the child subscriber terminal unit 2 further comprise the following units.

A channel signal receiving unit of the parent subscriber terminal unit 1 receives a channel command signal that represents a desired receive channel of the child subscriber terminal unit 2.

A control unit causes the information output unit 4 to output the information descrambled by the descrambling unit 3 to the parent unit side information presenting unit 6 or the child subscriber terminal unit 2, based on a channel command signal, which represents a desired receive channel of the child subscriber terminal unit 2, and a desired receive channel of the parent subscriber terminal unit 1.

The parent unit side information presenting unit 6 displays image information and/or outputs sound information, which are descrambled by the descrambling unit 3.

The channel signal output unit of the child subscriber terminal unit 2 outputs a channel command signal, which represents a desired receive channel of the child unit side information presenting unit 7, to the parent subscriber terminal unit 1.

The child unit side information presenting unit 7 displays image information and/or outputs sound information, which are descrambled by the parent subscriber terminal unit 1.

According to the present invention, since the parent subscriber terminal unit 1 descrambles scrambled information and outputs the descrambled information to the child subscriber terminal unit 2, the child subscriber terminal unit 2 is not required to have the descrambling function, thereby simplifying the construction of the child subscriber terminal unit 2.

For example, in an information receiving system, in which a center controls a subscriber terminal unit for charging each subscriber, the subscriber terminal units that the center should control are only the parent subscriber terminal units that have the descrambling function. Thus, the load of the processing performed by the center is remarkably reduced. For example, in a CATV receiving system, in the house of a subscriber, TV signal, terminal control signal, and the like transmitted from the CATV center can be received by one parent subscriber terminal unit 1, even if CATV programs are received with a plurality of TV receivers. The CATV center controls only one parent subscriber terminal unit 1 in the house. Thus, even if the number of subscriber terminal units per subscriber increases, the number of subscriber terminal units controlled by the center can be reduced. Consequently, the processing time for controlling the subscriber terminal units can be reduced.

According to the present invention, channel command signal, which represents a desired receive channel of the child subscriber terminal unit 2, is output to the parent subscriber terminal unit 1. The parent subscriber terminal unit 1 outputs the descrambled information to the child subscriber terminal unit 2 or the parent unit side information presenting unit 6 depending on the desired receive channel of the parent subscriber terminal unit 1 and the channel command signal of the child subscriber terminal unit 2. Thus, even if a pay channel program that is being displayed on a display unit connected to the parent subscriber terminal unit 1 is switched to another display unit connected to the child subscriber terminal unit 2 in another room, the pay channel program is received through the same parent subscriber terminal unit 1. Consequently the user is not doubly charged for the pay channel program.

Next, with reference to the accompanying drawings, an embodiment of the present invention will be described. Hereinafter, the present invention is applied to a CATV receiving system.

Figure 4:
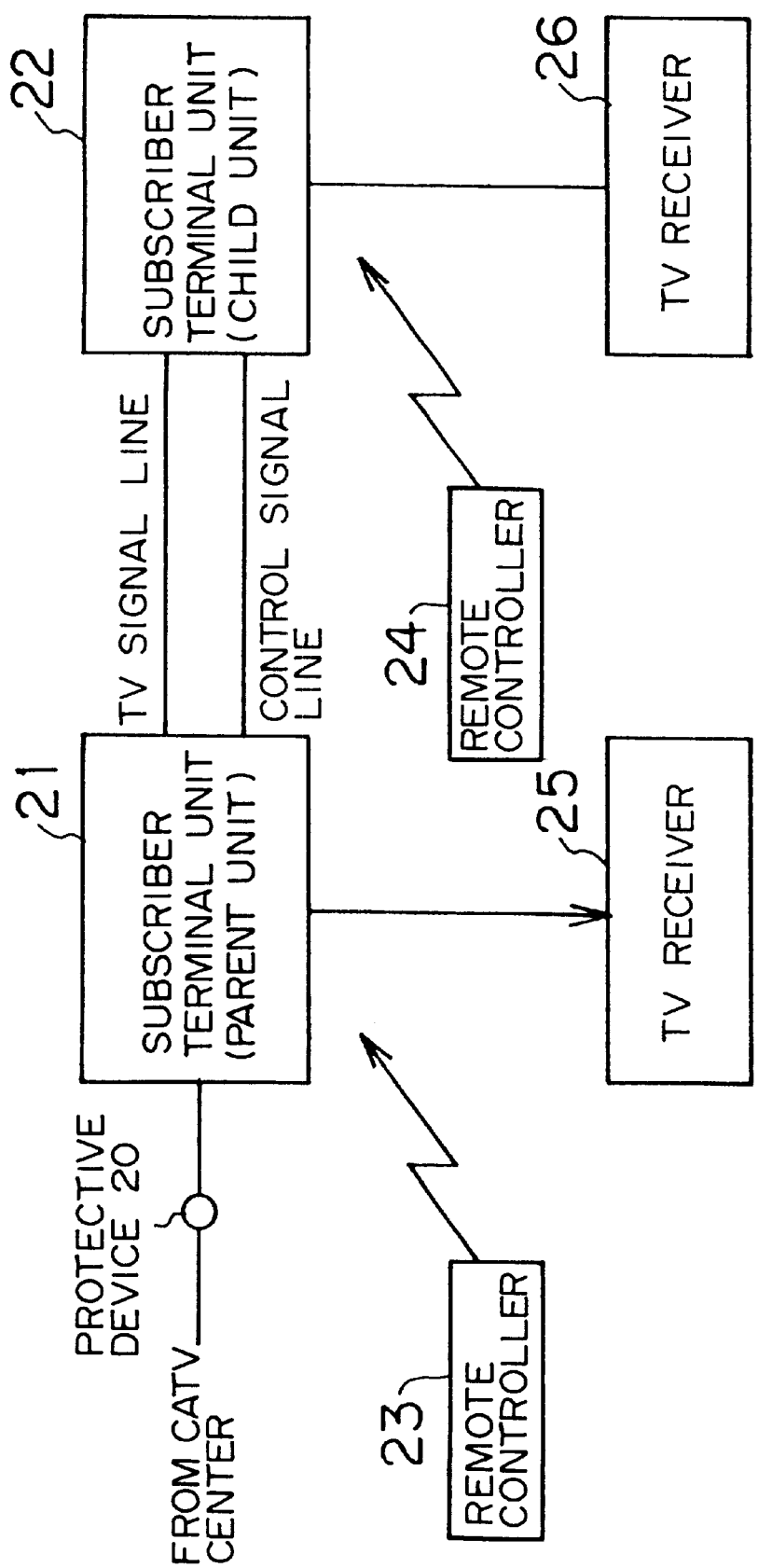
FIG. 4 is a block diagram showing the construction of a CATV receiving system according to an embodiment of the present invention.

FIG. 4 is a block diagram showing the construction of a CATV receiving system according to an embodiment of the present invention. In the CATV receiving system according to the present invention, two subscriber terminal units, parent subscriber terminal unit 21 and child subscriber terminal unit 22, are disposed in the house of a subscriber. The parent subscriber terminal unit (hereinafter referred to as parent unit) 21 receives a TV signal and a terminal control signal from a CATV center through a protective device 20. The parent unit 21 outputs a TV signal of a channel designated by a remote controller 23 to a TV receiver 25 connected thereto, and a TV signal of a channel selected by the child subscriber terminal unit (hereinafter referred to as child unit) 22 to the child unit 22 through a TV signal line. The parent unit 21 has a descrambling function for descrambling a scrambled TV signal received from the CATV center.

The parent unit 21 has a selection switch, which is not shown in FIG. 4, for switching a descrambled TV signal to the TV receiver 25 on the parent unit 21 side or to the TV receiver 26 on the child unit 22 side. The TV receiver 25 on the parent unit 21 side is referred to as parent unit side TV receiver 25. The TV receiver 26 on the child unit 22 side is referred to as child unit side TV receiver 26.

The child unit 22 has a remote controller 24 that selects a channel to be received. The child unit 22 outputs the control signal that represents the channel designated by the remote controller 24 to the parent unit 21 through a control signal line. In addition, the child unit 22 has a function for outputting the TV signal received from the parent unit 21 through the TV signal line to the TV receiver 26 connected to the child unit 22.

Figure 5:
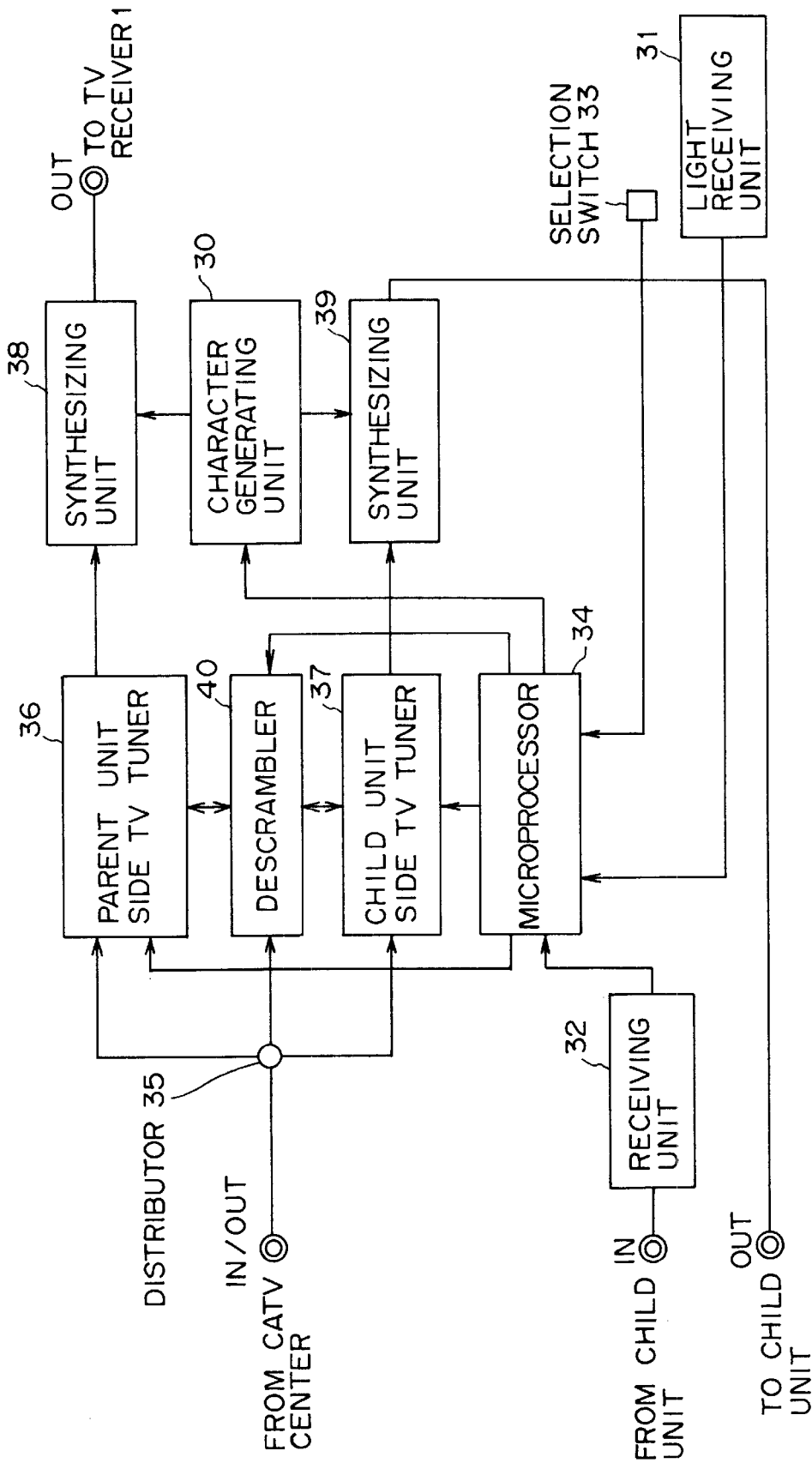
FIG. 5 is a block diagram showing the construction of a parent subscriber terminal unit of the CATV receiving system.

Next, with reference to FIG. 5, the construction of the parent unit 21 will be described. A light receiving unit 31 receives an optical signal for channel selection from a parent unit side remote controller 23, converts the optical signal into an electric signal, and outputs the electric signal to a microprocessor 34. A receiving unit 32 receives a control signal that represents a desired receive channel of the child unit 22 and outputs the control signal to the microprocessor 34.

A selection switch 33 switches a pay channel program to the parent unit 21 or to the child unit 22. A status signal of the selection switch 33 is input to the microprocessor 34.

The TV signal received from the CATV center is supplied to a distributor 35 that distributes the TV signal to a parent unit side TV tuner 36, a child unit side TV tuner 37, and a descrambler 40. The parent unit side TV tuner 36 and the child unit side TV tuner 37 tune a TV signal of a channel selected by the parent unit 21 and the child unit 22, respectively, under the control of the microprocessor 34.

When a TV signal of a channel selected by the parent unit 21 or the child unit 22 is not a scrambled signal, the parent unit side TV tuner 36 or the child unit side TV tuner 37 demodulates the TV signal of the selected channel and outputs the demodulated signal to a parent unit side synthesizing unit 38 or a child unit side synthesizing unit 39, respectively.

When a TV signal of a channel selected by the parent unit 21 or the child unit 22 is a scrambled signal, the parent unit side TV tuner 36 or the child unit side TV tuner 37 demodulates the selected channel and outputs the demodulated signal to a descrambler 40. The descrambler 40 descrambles the received signal and sends the descrambled signal back to the parent unit side TV tuner 36 or the child unit side TV tuner 37, respectively. The descrambled TV signal is output to a parent unit side synthesizing unit 38 or a child unit side synthesizing unit 39.

A character generating unit 30 generates a message that indicates that, for example, a pay channel program cannot be displayed. The character generating unit 30 outputs the message to the parent unit side synthesizing unit 38 or the child unit side synthesizing unit 39 under the control of the microprocessor 34.

The parent unit side synthesizing unit 38 and the child unit side synthesizing unit 39 synthesize TV signal received from the parent unit side TV tuner 36 and the child unit side TV tuner 37, respectively, with the message received from the character generating unit 30.

The microprocessor 34 is a central processing unit that performs, for example, operations that causes the parent unit side TV tuner 36 and the child unit side TV tuner 37 to tune a desired receive channel, the descrambler 40 to descramble a TV signal, and the character generating unit 30 to generate a message.

Figure 6:
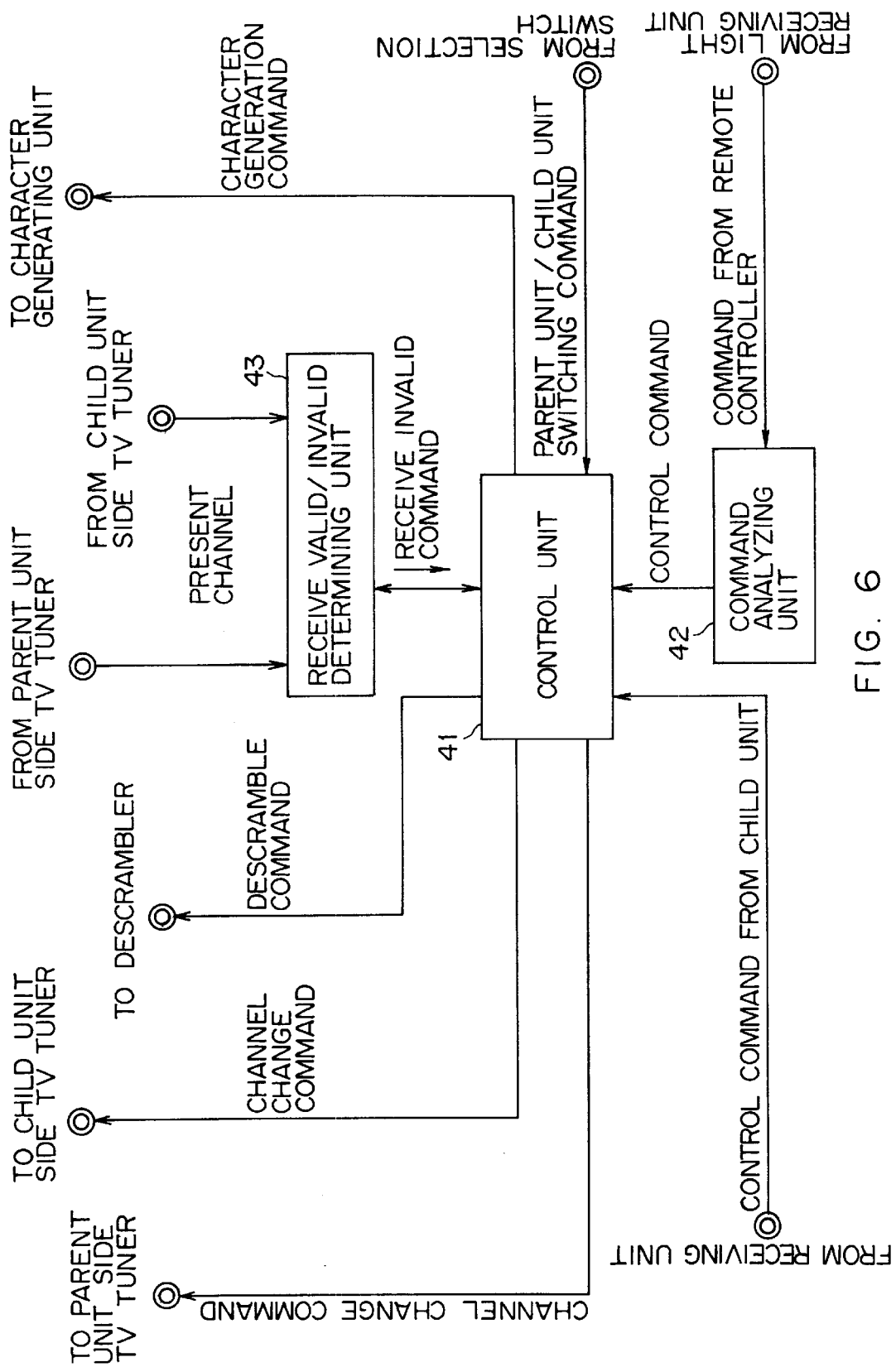
FIG. 6 is a block diagram showing the construction of a microprocessor of the parent subscriber terminal unit.

With reference to FIG. 6, the construction of the microprocessor 34 will be described. As shown in FIG. 6, the microprocessor 34 comprises a control unit 41, a command analyzing unit 42, and a receive valid/invalid determining unit 43. The command analyzing unit 42 analyzes an electric signal received from the light receiving unit 31 and sends a receive channel commanded by the parent unit side remote controller 23 to the control unit 41.

The control unit 41 inquires of the receive valid/invalid determining unit 33 whether or not a receive channel can be changed, based on the control command received from the child unit 22 by the receiving unit 32 (namely, the channel change command signal that causes the receive channel of the child unit 22 to be changed), the command received from the remote controller 23 of the parent unit 21 and analyzed by the analyzing unit 42 (namely, the channel change command signal that commands the receive channel of the parent unit 21).

When the control unit 41 inquires of the receive valid/invalid determining unit 43 whether or not the child unit 22 can receive a pay channel program, the receive valid/invalid determining unit 43 determines whether or not the parent unit side TV tuner 36 is receiving a pay channel program. When the pay channel program is not being received, the receive valid/invalid determining unit 43 outputs a receive valid command signal to the control unit 41. When the pay channel program is being received, the receive valid/invalid determining unit 43 outputs a receive invalid command signal to the control unit 41. In addition, when the control unit 41 inquires of the receive valid/invalid determining unit 43 whether or not the parent unit 31 can receive a pay channel program, the receive valid/invalid determining unit 43 determines whether or not the child unit side TV tuner 37 is receiving a pay channel program. When the pay channel program is not being received, the receive valid/invalid determining unit 43 outputs a receive valid command signal to the control unit 41. When the pay channel program is being received, the receive valid/invalid determining unit 43 outputs an receive invalid command signal to the control unit 41.

When the control unit 41 receives the receive valid command signal, which indicates that the child unit 22 or the parent unit 21 can receive a desired pay channel program, from the receive valid/invalid determining unit 43, the control unit 41 determines whether or not the selection switch 33 is switched to a unit side that requests to receive a pay channel program. When the selection switch 33 is placed on the unit side that requests to receive the pay channel program, the control unit 41 causes the corresponding TV tuner to tune the desired pay channel program. When the selection switch 33 is not placed on the unit side that requests to receive the pay channel program or when the control unit 41 receives the receive invalid command signal from the receive valid/invalid determining unit 43, the control unit 41 causes the character generating unit 30 to display a message that indicates that the pay channel program cannot be displayed. The child unit side synthesizing unit 39 or the parent unit side synthesizing unit 38 synthesize the message, which indicates that the pay channel program cannot be displayed, with a TV signal received from the child unit side TV tuner 37 or the parent unit side TV tuner 36 and outputs the synthesized signal to the TV receiver 25 connected to the parent unit 21 or the child unit 22. Thus, the child unit side TV receiver 26 or the parent unit side TV receiver 25 displays the message that indicates that the pay channel program cannot be displayed.

For example, when a pay channel program is attempted to be displayed on the child unit side TV receiver 26, if the pay channel program is being displayed on the parent unit side TV receiver 25, the receive valid/invalid determining unit 43 outputs a receive invalid command signal, which indicates that the pay channel program cannot be displayed, to the control unit 41 since the receiving system of the present embodiment does not allow both the parent unit 21 and the child unit 22 to display a pay channel program at the same time. When the control unit 41 receives the receive invalid command signal, it causes the character generating unit 30 to generate a message that indicates that the pay channel program cannot be displayed. The message is displayed on the child unit side TV receiver 26.

When the pay channel program cannot be displayed, if the pay channel program is selected by operating the remote controller 23 or 24, the message that indicates that the pay channel program cannot be displayed is displayed on the child unit side TV receiver 26 or the parent unit side TV receiver 25. Therefore, the user who attempted to see the pay channel program knows that the user can't watch the pay channel program because the same pay channel program is being displayed by the other subscriber terminal unit.

Figure 7:
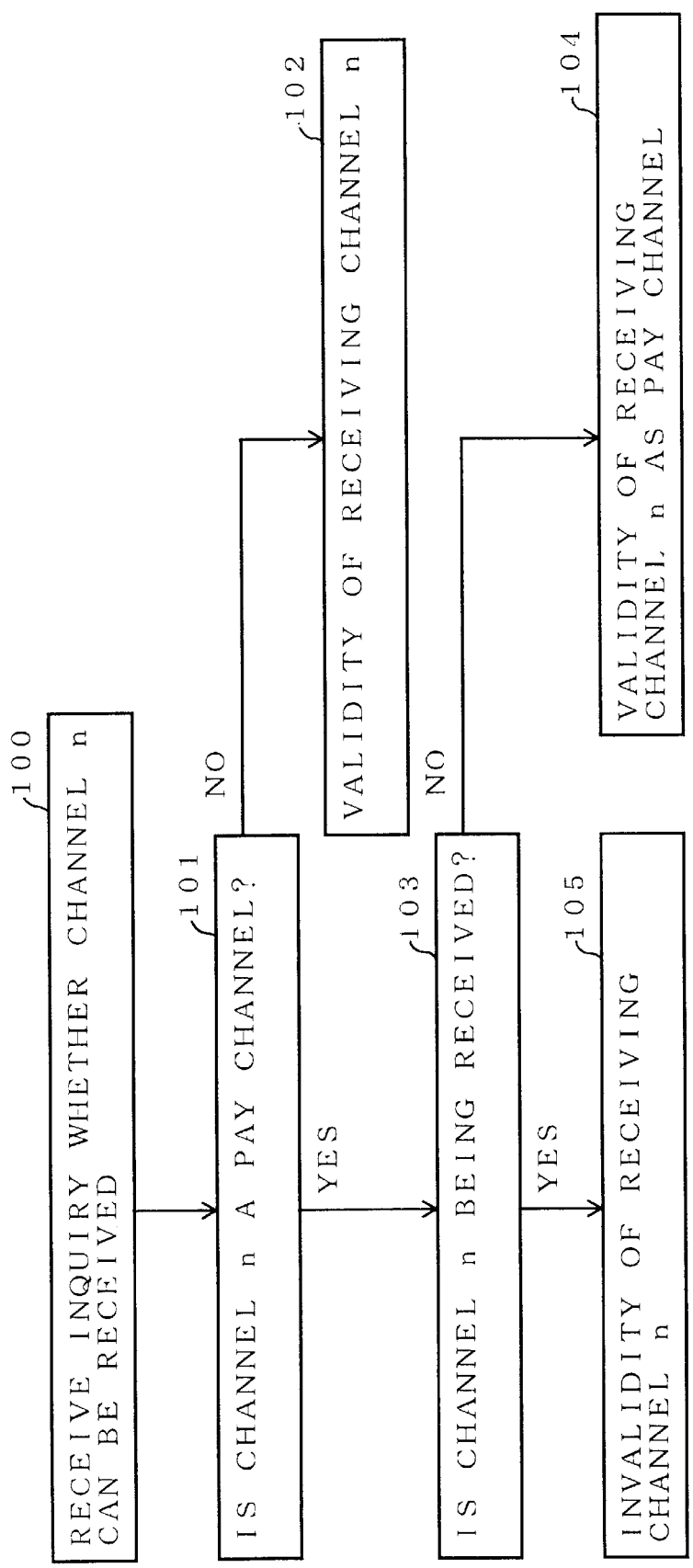
FIG. 7 is a flow chart showing a process sequence of a receive valid/invalid determining unit.

FIG. 7 is a flow chart showing a process sequence of the receive valid/invalid determining unit 43. When the control unit 41 inquires of the receive valid/invalid determining unit 43 whether or not a channel n (n is a channel number) can be received (at step 100), the receive valid/invalid determining unit 43 determines whether or not the inquired channel n is a pay channel (at step 101). When the channel n is a free channel, the receive valid/invalid determining unit 43 returns a receive valid command of the channel n to the control unit 41 (at step 102). When the channel n is a pay channel, the receive valid/invalid determining unit 43 determines whether or not the parent unit 21 or the child unit 22 is receiving the channel n (at step 103). When there is no tuner that is receiving the channel n, the receive valid/invalid determining unit 43 sends a receive valid command of the channel n to the control unit 41 (at step 104). When there is a tuner that is receiving channel n, the receive valid/invalid determining unit 43 sends a receive invalid command of the channel n to the control unit 41 (at step 105).

Figure 8:
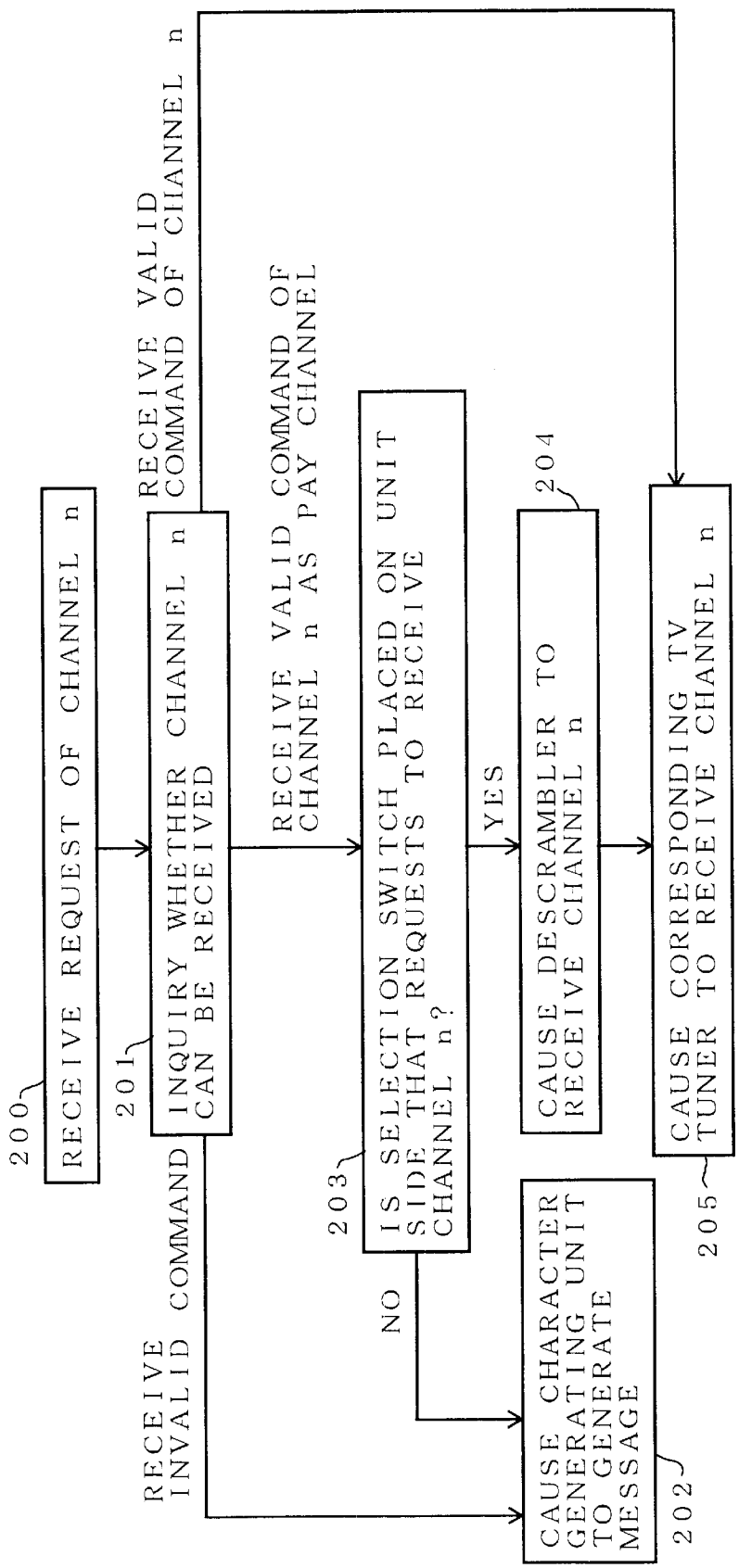
FIG. 8 is a flow chart showing a process sequence of a control unit.

FIG. 8 is a flow chart showing a process sequence of the control unit 41. When the control unit 41 receives a request for changing the present channel to channel n from the command analyzing unit 42 or the child unit 22 (at step 200), it inquiries of the receive valid/invalid determining unit 43 whether or not the channel n can be received (at step 201). When the control unit 41 receives the receive valid command of the channel n from the receive valid/invalid determining unit 43, it causes the TV tuner of the parent unit 21 or the child unit 22 that requests to change the present channel to the channel n to receive the channel n (at step 205). When the control unit 41 receives a receive invalid command of the channel n from the receive valid/invalid determining unit 43, the control unit 41 causes the character generating unit 30 to generate a message that indicates that the pay channel program cannot be displayed (at step 202).

When the control unit 41 receives a receive valid command of the channel n, it determines whether or not the selection switch 33 is placed on the unit side that requests to receive the channel n (at step 203). When the selection switch 33 is not placed in on the unit side that requests to receive the channel n, the control unit 41 causes the character generating unit 30 to generate a message that indicates that the pay channel program cannot be displayed (at step 202). When the selection switch 33 is placed on the unit side that requests to receive the channel n, the control unit 41 causes the descrambler 40 to descramble the TV signal of the channel n and the corresponding TV tuner to receive the channel n (at steps 204 and 205).

Figure 9:
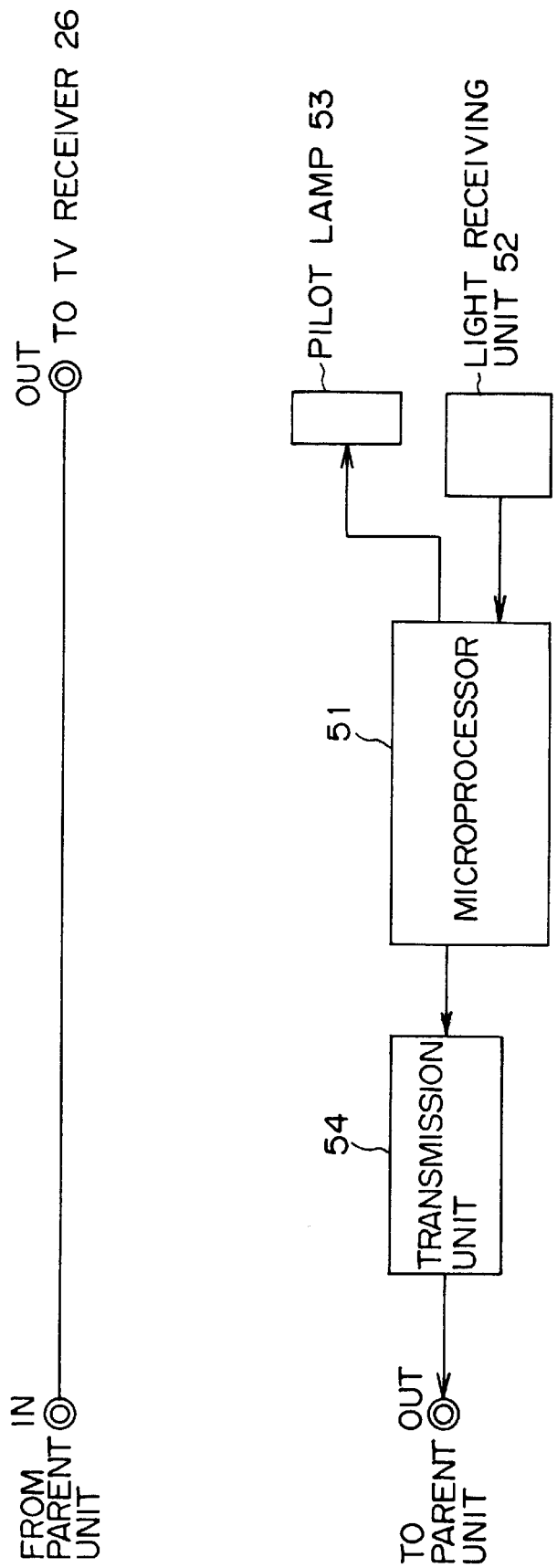
FIG. 9 is a schematic diagram showing the construction of a child subscriber terminal unit.

FIG. 9 is a schematic diagram showing the construction of the child unit 22. The child unit 22 comprises a microprocessor 51, a light receiving unit 52, a pilot lamp 53, and a transmission unit 54. The microprocessor 51 controls the overall operations of the child unit 22. The light receiving unit 52 receives an optical signal from the child unit side remote controller 24 and converts the optical signal into an electric signal. The pilot lamp 53 lights up while the child unit 22 is receiving a pay channel program. The transmission unit 54 outputs to the parent unit 21 a channel change command signal that represents a channel selected by the child unit side remote controller 24.

Figure 10:
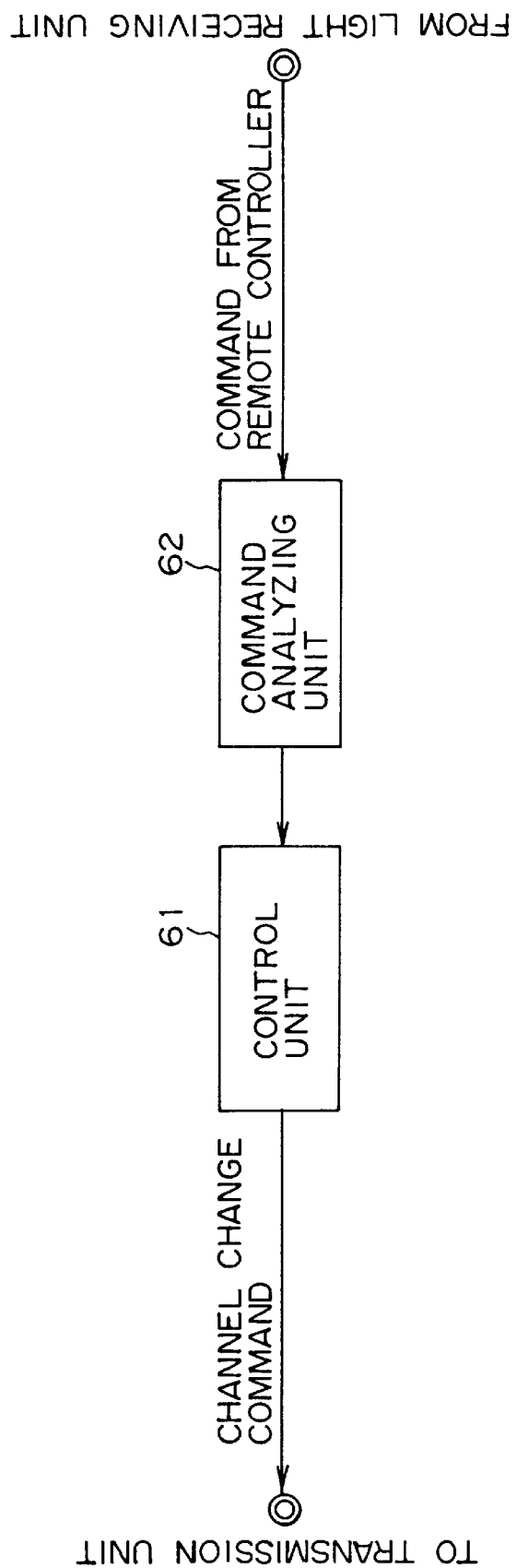
FIG. 10 is a schematic diagram showing the construction of a microprocessor of the child subscriber terminal unit.

As shown in FIG. 10, the microprocessor 51 comprises a control unit 61 and a command analyzing unit 62. The command analyzing unit 62 analyzes a signal received from the light receiving unit 52 and sends a channel designated by the remote controller 24 to the control unit 61. The control unit 61 sends a channel change command corresponding to a command received from the command analyzing unit 62 to the transmission unit 54.

In other words, when a channel to be received is selected by the child unit side remote controller 24, an optical signal corresponding to the channel is output from the remote controller 24 to the light receiving unit 52 of the child unit 22. The light receiving unit 52 converts the optical signal to an electric signal. The command analyzing unit 62 analyzes the electric signal and outputs a signal that represents the selected channel to the control unit 61. The control unit 61 of the child unit 22 causes the transmission unit 54 to output the channel change command signal, which commands the switching of the present channel to the channel selected by the remote controller 24, to the parent unit 21.

Figure 11:
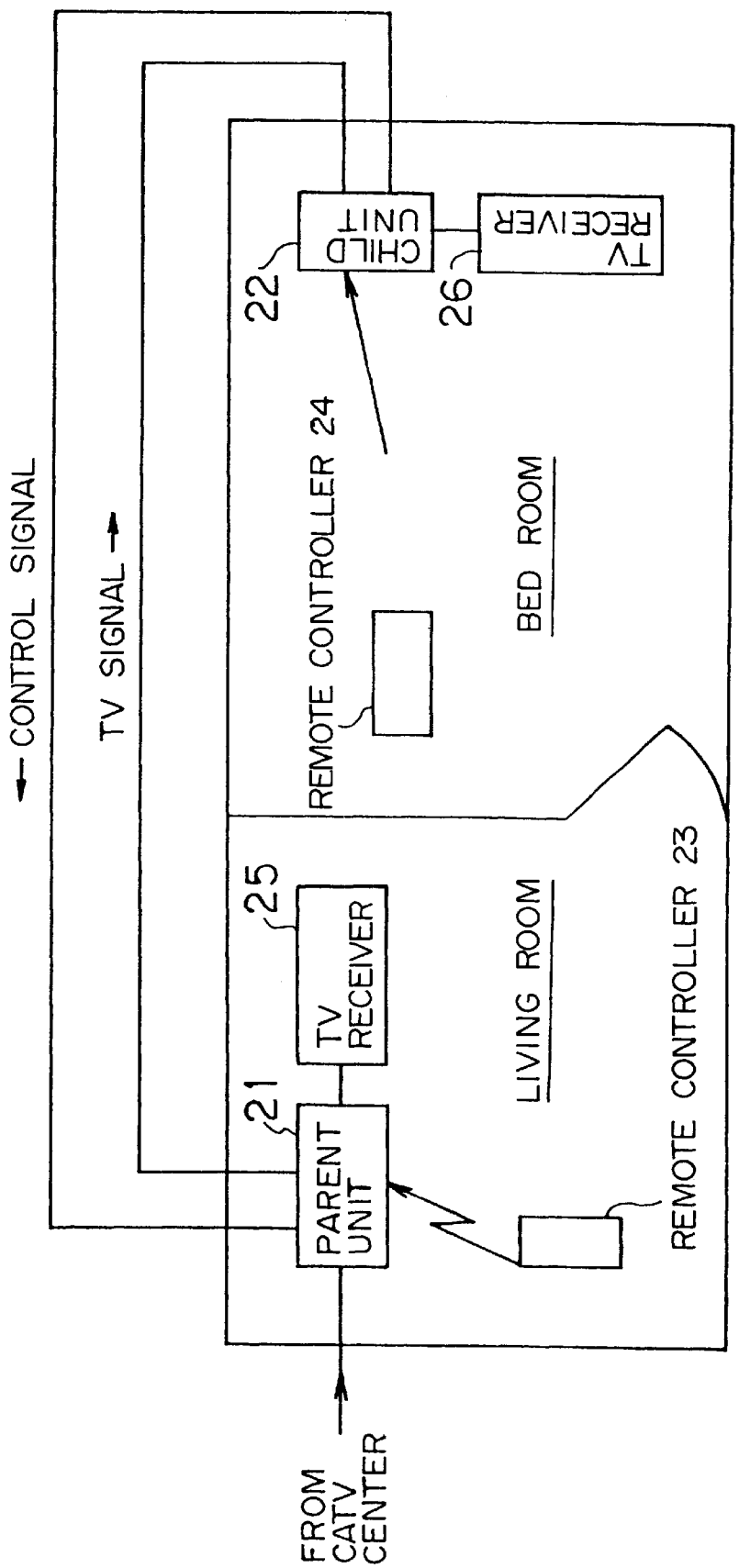
FIG. 11 is a schematic diagram showing a layout of the parent subscriber terminal unit and the child subscriber terminal unit.
Figure 12:
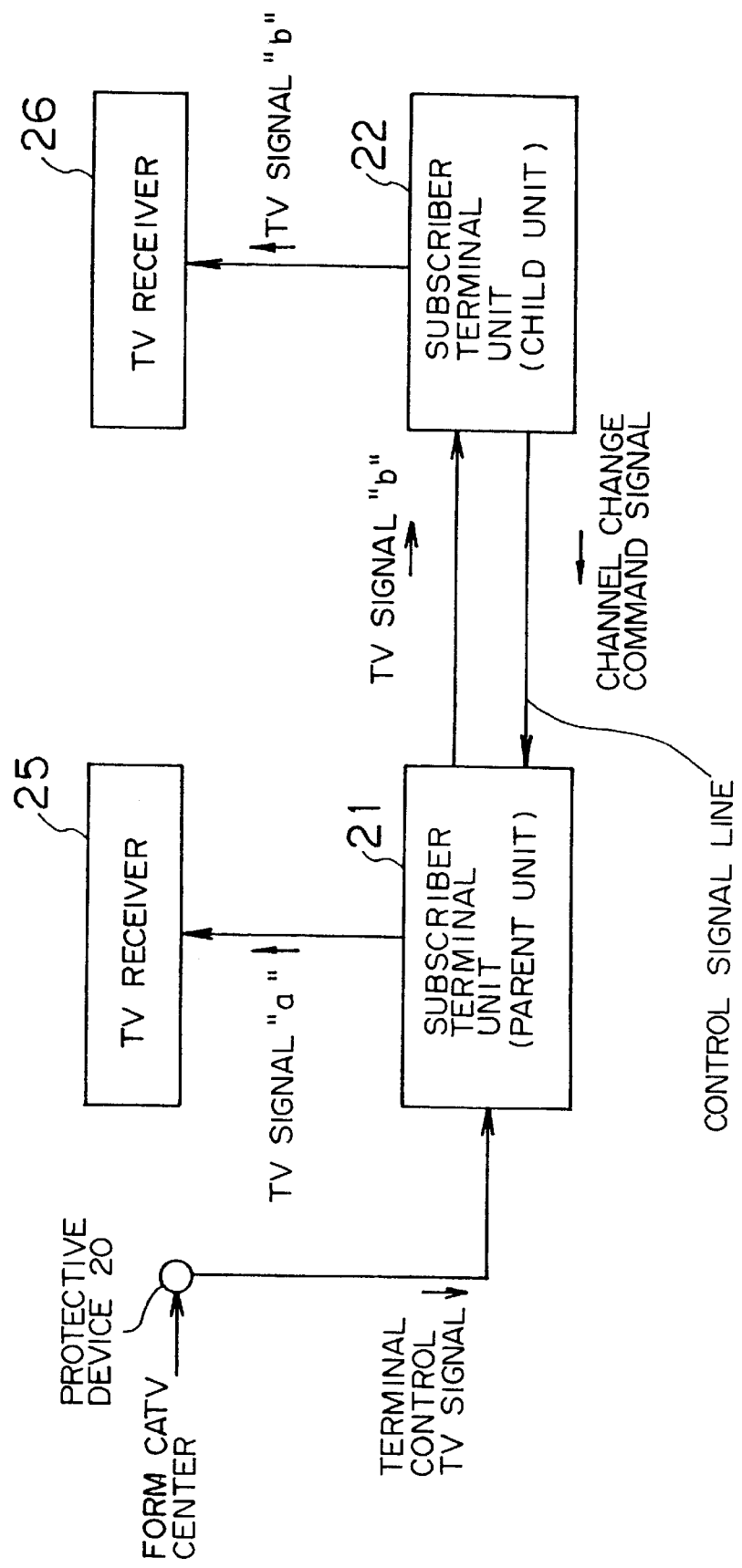
FIG. 12 is a schematic diagram for explaining signals exchanged between the parent subscriber terminal unit and the child subscriber terminal unit.

Next, the operations of the parent unit 21 and the child unit 22 when the two TV receivers 25 and 26 display CATV programs will be described. FIG. 11 is a schematic diagram showing a layout where the TV receivers 25 and 26 are disposed in a living room and a bed room and connected to the parent unit 21 and the child unit 22, respectively. FIG. 12 is a schematic diagram showing signals exchanged between the parent unit 21 and the child unit 22.

As shown in FIG. 12, the CATV center outputs a TV signal, a control code, and the like to the parent unit 21 with an unique address of the parent unit 21. The control code is used to descramble a scrambled TV signal.

When the user wants to see a CATV pay program with the TV receiver 25 in the living room, he or she places the selection switch 33 to the parent unit 21 position. When the selection switch 33 is placed in the parent unit 21 position, the parent unit 21 can receive all programs including pay programs. At this point, the child unit 22 can receive free programs other than pay programs. When the user on the child unit 22 side selects a conventional channel program with the remote controller 24, the child unit 22 outputs a channel change command signal to the parent unit 21 through a control signal line.

The control unit 41 of the parent unit 21 causes the child unit side TV tuner 37 to tune a TV signal of a channel requested by the child unit 22. The child unit side TV tuner 37 receives the TV signal of the requested channel. When a pay channel program is requested by the remote controller 23 of the parent unit 21, the parent unit side TV tuner 36 tunes and receives the TV signal of the requested pay channel. As shown in FIG. 12, the parent unit 21 outputs to the parent unit side TV receiver 25 a TV signal "a" that is received by the parent unit side TV tuner 36. In addition, the parent unit 21 outputs a TV signal "b" received by the child unit side TV tuner 37 to the child unit 22. The child unit 22 outputs the TV signal "b" received from the parent unit 21 to the child unit side TV receiver 26.

Thus, the pay channel program can be displayed on the parent unit side TV receiver 25 in the living room. The conventional channel program can be displayed on the child unit side TV receiver 26 in the bed room.

On the other hand when the user wants to see a pay channel program with the TV receiver 26 in the bed room, he or she places the selection switch 33 of the parent unit 21 in the child unit 22 position and then selects a pay channel program with the child unit side remote controller 24.

When a pay channel program is selected with the child unit side remote controller 24, as shown in FIG. 12, a channel change command signal, which commands the switching of the present channel to a pay channel, is output from the child unit 22 to the parent unit 21 through the control signal line.

The parent unit 21 receives the channel change command signal through the control signal line and causes the child unit side TV tuner 37 to tune and receive the TV signal of the requested pay channel program and the descrambler 40 to descramble the TV signal. The descrambled signal is output to the child unit 22 through the TV signal line. The child unit 22 outputs the TV signal received from the parent unit 21 to the TV receiver 26 connected thereto.

While a pay channel program is being displayed on the parent unit side TV receiver 25, if the selection switch 33 is switched to the child unit 22 position, the character generating unit 30 causes the parent unit side TV receiver 25 to display a message that indicates that the selection switch 33 has been switched to the child unit 22 position. For example, a message "SELECTION SWITCH WAS SWITCHED" is displayed. While a pay channel program is being displayed on the child unit 22 side, if the selection switch 33 is switched to the parent unit 21 position, the same operation is performed.

Thus, while a pay channel program is being displayed on the parent unit side TV receiver 25 in the living room, if the selection switch 33 of the parent unit 21 is switched to the child unit 22 side, the same pay channel program can be displayed by the child unit side TV receiver 26 in the bed room. In this case, although a pay channel program is received by the two TV receivers 25 and 26, the program displayed on the TV receiver 25 and the program displayed on the TV receiver 26 are managed by the parent unit 21. When a pay channel program is displayed, it is charged through the parent unit 21. Thus, unlike with the conventional system, when the same program is successively received with different TV receivers, double charging can be prevented.

Figure 13:
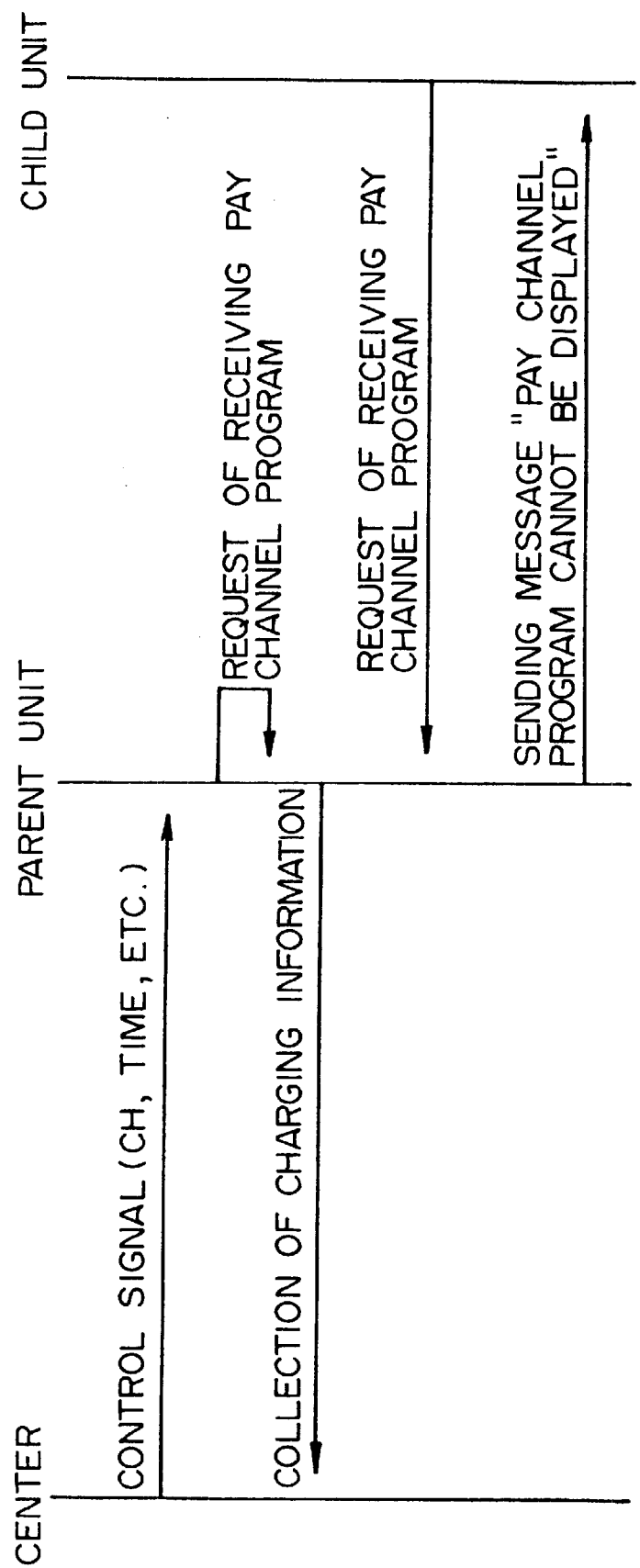
FIG. 13 is a schematic diagram showing a control sequence in the case that the child subscriber terminal unit attempts to receive a pay channel program while the parent subscriber terminal unit is receiving the pay channel program.
Figure 14:
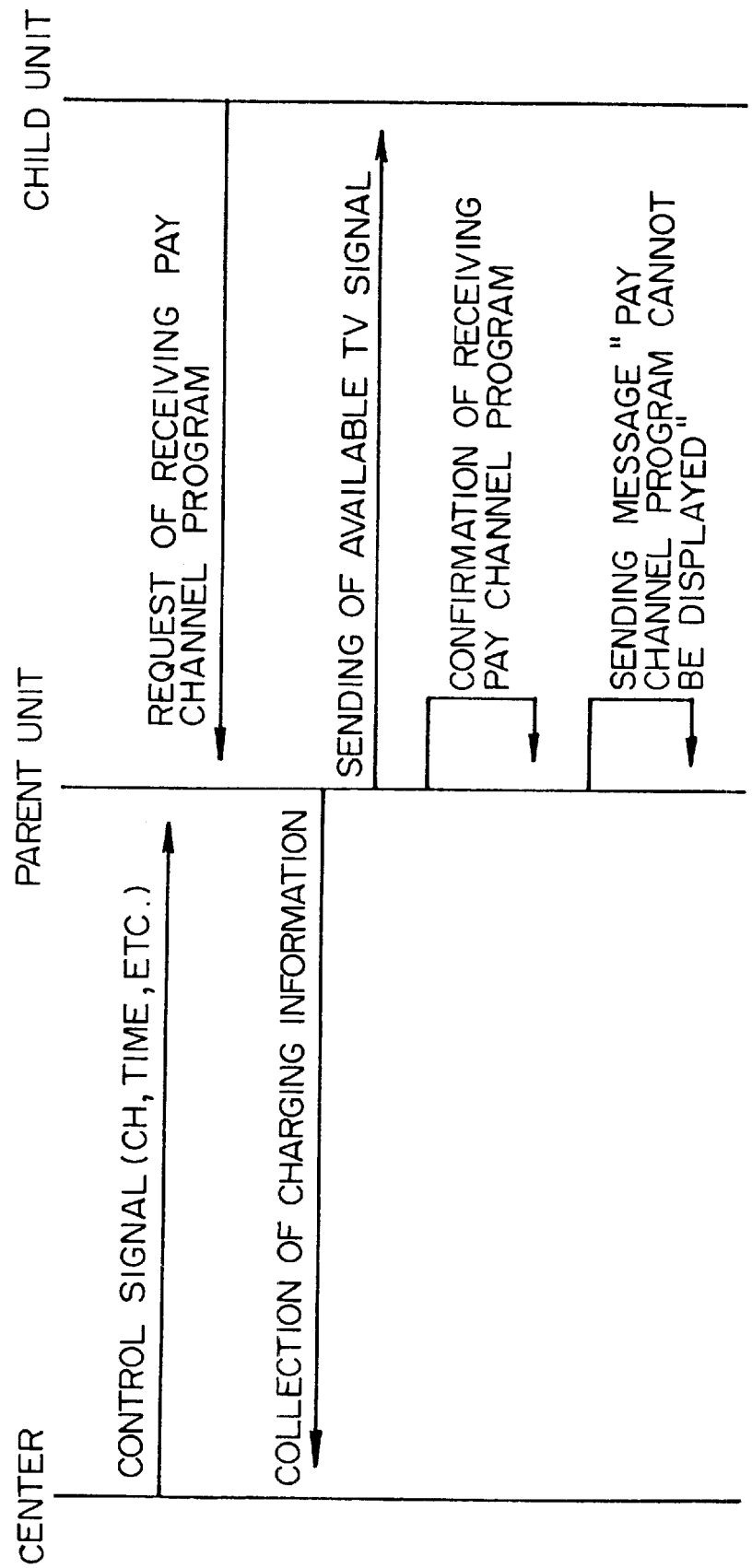
FIG. 14 is a schematic diagram showing a control sequence in the case that the parent subscriber terminal unit attempts to receive a pay channel program while the child subscriber terminal unit is receiving the pay channel program.

Next, with reference to FIGS. 13 and 14, a control sequence in the case that the child unit 22 attempts to receive a pay channel program while the parent unit 21 is receiving a pay channel program and a control sequence in the case that the parent unit 21 attempts to receive a pay channel program while the child unit 22 is receiving a pay channel program will be described.

First, with reference to FIG. 13, the control sequence in the case that the child unit 22 attempts to receive a pay channel program while the parent unit 21 is receiving a pay channel program will be described.

The CATV center outputs terminal control signals that contain available channels, present time, and descramble control information to each parent unit 21.

In the case that the selection switch 33 of the parent unit 21 is placed in the parent unit 21 position, when the remote controller 23 of the parent unit 21 is operated to receive a pay channel program, the control unit 41 causes the parent unit side TV tuner 36 to receive the pay channel program. In this condition, when the control unit 41 receives a channel change command signal, which commands the reception of a pay channel program, from the child unit 22, the receive valid/invalid determining unit 43 of the parent unit 21 determines whether or not the channel that the parent unit 21 is receiving is a pay channel. In this case, since the parent unit 21 is receiving a pay channel program, the receive valid/invalid determining unit 43 outputs a receive invalid command signal, which indicates that a pay channel program cannot be displayed, to the control unit 41.

When the control unit 41 receives the receive invalid command signal from the receive valid/invalid determining unit 43, it causes the character generating unit 30 to output a message "PAY CHANNEL PROGRAM CANNOT BE DISPLAYED" to the child unit side synthesizing unit 39. The child unit side synthesizing unit 39 synthesizes the TV signal received from the child unit side TV tuner 37 with the message "PAY CHANNEL PROGRAM CANNOT BE DISPLAYED" received from the character generating unit 30 and outputs the synthesized signal to the child unit 22.

Thus, the message "PAY CHANNEL PROGRAM CANNOT BE DISPLAYED" is displayed on the child unit side TV receiver 26. Consequently, the user who wants to see a pay channel program on the child unit side knows that since a pay channel program is being received by another subscriber terminal unit, the pay channel program cannot be displayed on the child unit side TV receiver 26.

Next, with reference to FIG. 14, the control sequence in the case that the parent unit 21 attempts to receive a pay channel program while the child unit 22 is receiving the pay channel program will be described.

In the condition that the selection switch 33 of the parent unit 21 is placed in the child unit 22 position, when the child unit side remote controller 24 is operated to select a pay channel program, the child unit 22 outputs a channel change command signal, which commands the reception of a pay channel program, to the parent unit 21. The parent unit 21 receives a TV signal of the requested pay channel from the CATV center and outputs the TV signal to the child unit 22. In this condition, when a pay channel is selected by the remote controller 23 of the parent unit 21, the receive valid/invalid determining unit 43 of the parent unit 21 determines whether or not the channel that the child unit 22 is receiving is a pay channel. In this case, since the child unit 22 is receiving a pay channel program, the receive valid/invalid determining unit 43 outputs a receive invalid command signal, which indicates that a pay channel program cannot be received, to the control unit 41.

The control unit 41 causes the character generating unit 30 to generate a message that indicates that a pay channel program cannot be displayed. Thus, a message "PAY CHANNEL PROGRAM CANNOT BE DISPLAYED" is displayed on the parent unit side TV receiver 25. Thus, the user who attempts to see a pay channel program on the TV receiver 25 knows that a pay channel program cannot be displayed on the TV receiver 25.

In the above-described embodiment, the selection switch 33, which switches the pay channel program receiving unit to the parent unit 21 or to the child unit 22, is disposed on the parent unit 21 side. However, the switching of the reception of the pay channel program may be performed by the remote controllers 23 and 24 of the parent unit 21 and the child unit 22, respectively. In this case, a switching signal that represents which terminal unit receives a pay channel program may be sent from the child unit 22 to the parent unit 21 through the control signal line. The parent unit 21 may control the selection of the parent unit 21 or the child unit 22 that receives the pay channel program, based on the switching signal.

The signal processing of the TV signal for restricting the reception of pay channel programs is not limited to the scrambling method. Instead, another method may be used. For example, the CATV center may encode part of signal and send the encoded signal to the subscriber terminal unit. The subscriber terminal unit may decode the part of the signal so as to receive the TV signal.

As well as pay channel programs, the parent unit 21 may manage conventional free programs that the child unit 22 receives. In this case, the parent unit 21 can know a program that the child unit 22 is receiving.

In the above-described embodiment, the parent unit 21 has the parent unit side TV tuner 36 and the child unit side TV tuner 37. However, the child unit side TV tuner 37 may be disposed in the child unit 22 side. The control unit 41 of the parent unit 21 may control a receive channel of the child unit side TV tuner 37 based on the determination result of the receive valid/invalid determining unit 43. In this case, since the parent unit 21 manages the receive channel of the child unit 22, the channel that the child unit 22 is receiving may be sent to the parent unit 21 through the control signal line.

In addition, the CATV receiving system according to the present invention may be applied to a system with two or more child units.

According to the above-described embodiment, since one subscriber terminal unit (parent unit) that exchanges terminal control signals and the like with the CATV center is provided for each subscriber rather than each TV receiver, the load of the processing performed by the computer of the CATV center can be reduced. In addition, the parent unit manages receive channel of the child unit. Therefore, even if a pay channel program is switched from a TV receiver connected to the parent unit to another TV receiver connected to the child unit, the double charging can be prevented.

The present invention is not limited to the above-described CATV receiving system. Instead, the present invention can be applied to all information receiving systems that descramble scrambled information and present the descrambled information. In addition, the received information may be sound signals and the like as well as image information.

According to the present invention, since scrambled information is descrambled by a parent subscriber terminal unit and the descrambled information is output to a child subscriber terminal unit, even if a plurality of subscriber terminal units are installed in the house of a subscriber, only the parent subscriber terminal unit have a descrambling function. Thus, the construction of the child subscriber terminal unit is simplified. In addition, in a system where a center transmits scrambled information to a plurality of subscriber terminal units, when only the parent subscriber terminal unit has the descrambling function, the number of subscriber terminal units controller by the center can be decreased and thereby the load of the processing performed by the center can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image information receiving system, constructed of a center for transmitting information and plurality of subscriber terminal units, for descrambling scrambled information and presenting the descrambled information, comprising:

a) a parent subscriber terminal unit including:
descrambling unit receiving scrambled information from an external source and descrambling said scrambled information;
information output unit, connected to said descrambling unit, outputting the descrambled information received from the descrambling unit; and
a parent unit side information presenting unit, connected to said information output unit, presenting information received from the information output unit; and b) a child subscriber terminal unit including:
a receiving unit receiving the descrambled information from said parent subscriber terminal unit; and
a child unit side information presenting unit, connected to said receiving unit, presenting the descrambled information descrambled by said descrambling unit of said parent subscriber terminal unit and received by said receiving unit;

wherein said parent subscriber terminal unit further including:
a determining unit determining whether a pay channel program is receivable by one of said parent subscriber terminal unit and said child subscriber terminal unit based on a present receive channel of said parent subscriber terminal unit and a present receive channel of said child subscriber terminal unit.

2. An image information receiving system, constructed of a center for transmitting information and plurality of subscriber terminal units, for descrambling scrambled information and presenting the descrambled information, comprising:

a) a parent subscriber terminal unit including:
descrambling unit receiving scrambled information from an external source and descrambling said scrambled information;
information output unit, connected to said descrambling unit, outputting the descrambled information received from the descrambling unit; and
a parent unit side information presenting unit connected to said information output unit presenting information received from the information output unit; and b) a child subscriber terminal unit including:
   a receiving unit receiving the descrambled information from said parent subscriber terminal unit; and
   a child unit side information presenting unit, connected to said receiving unit, presenting the descrambled information descrambled by said descrambling unit of said parent subscriber terminal unit and received by said receiving unit;
wherein said parent subscriber terminal unit further including:
   a control unit controlling switching of the descrambled image information descrambled by the descrambling unit to one of said child subscriber terminal unit and the parent unit side information presenting unit, based on a desired receive channel of said child subscriber terminal unit and a desired channel of said parent subscriber terminal unit.

3. The information receiving system according to claim 2, wherein said information receiving system is an image information receiving system constructed of a center for transmitting information and a plurality of subscriber terminal units,
wherein said parent subscriber terminal unit further comprises:
   channel signal receiving means for receiving a channel command signal that represents a desired receive channel of said child subscriber terminal unit; and
   said control means for controlling switching to one of said child unit side information presenting unit and said parent unit side information presenting unit based on the channel command signal of said child subscriber terminal unit received from the channel signal receiving means and the desired receive channel of said parent subscriber terminal unit, and
wherein said child subscriber terminal unit further comprises:
   channel signal output means for outputting a channel command signal that represents a desired receive channel of the child unit side information presenting unit to said parent subscriber terminal unit.

4. The information receiving system according to claim 2, wherein said parent subscriber terminal unit further comprises:
   switching means for switching the reception of a pay channel to one of said parent subscriber terminal unit and said child subscriber terminal unit; and
   control means for causing the descrambling means to descramble desired pay channel information of said parent subscriber terminal unit and the information output means to output the descrambled information to the parent unit side display unit when the switching means is placed on said parent subscriber terminal unit side and for causing the descrambling means to descramble desired pay channel information of said child subscriber terminal unit and the information output means to output the descrambled information to said child subscriber terminal unit when said switching means is placed on said child subscriber terminal unit side.

5. The information receiving system according to claim 2, wherein said information receiving system is a cable television receiving system for descrambling a scrambled television signal received from a cable television center,
wherein said descrambling means comprises:
   a parent unit side television tuner for receiving a television signal to be output to a parent unit side display unit connected to said parent subscriber terminal unit;
   a child unit side television tuner for receiving a television signal to be out put to a child unit side display unit connected to said child subscriber terminal unit; and
   channel switching means for controlling receive channels of the parent unit side television tuner and the child unit side television tuner so as to switch the receive channels of said parent subscriber terminal unit and said child subscriber terminal unit.

6. The information receiving system according to claimed 3,
wherein said child subscriber terminal unit further comprises:
   a remote controller for controlling the operation of said child subscriber terminal unit;
   a light receiving unit for receiving an optical signal from the remote controller and converting the optical signal into an electric signal;
   a command analyzing unit for analyzing the signal received from the light receiving unit; and
   a control unit for outputting a channel command signal to said parent subscriber terminal unit based on an analyzed result of the command analyzing unit.

7. The information receiving system according to claim 3, wherein at least one of said parent subscriber terminal unit and said child subscriber terminal unit further comprises:
   a determining unit for determining whether a pay channel program is receivable by one of said parent subscriber terminal unit and said child subscriber terminal unit based on a present receive channel of said parent subscriber terminal unit and a present receive channel of said child subscriber terminal unit.

8. The information receiving system according to claim 3, wherein said parent subscriber terminal unit further comprises:
   switching means for switching the reception of a pay channel to one of said parent subscriber terminal unit and said child subscriber terminal unit; and
   control means for causing the descrambling means to descramble desired pay channel information of said parent subscriber terminal unit and the information output means to output the descrambled information to the parent unit side display unit when the switching means is placed on said parent subscriber terminal unit side and for causing the descrambling means to descramble desired pay channel information of said child subscriber terminal unit and the information output means to output the descrambled information to said child subscriber terminal unit when said switching means is placed on said child subscriber terminal unit side.

9. The information receiving system according to claim 4, wherein said control means comprises:
   a determining unit for determining whether a pay channel program is receivable by one of said parent subscriber terminal unit and said child subscriber terminal unit based on a present receive channel of said parent subscriber terminal unit, a present receive channel of said child subscriber terminal unit, and the position of the switching means.

10. The information receiving system according to claim 4,
wherein said control means causes a display unit to display a message that indicates that a pay channel program cannot be received when a desired pay channel of one of said parent subscriber terminal unit and said child subscriber terminal unit is being received by the other subscriber terminal unit of the same subscriber.

11. The information receiving system according to claim 6, wherein said parent subscriber terminal unit further comprises:
- a remote controller for controlling the operation of said parent subscriber terminal unit;
- a light receiving unit for receiving an optical signal from the remote controller and converting the received signal into an electric signal;
- a command analyzing unit for analyzing the electric signal to determine a receive channel commanded by the remote controller;
- a receiving unit for receiving a channel command signal from said child subscriber terminal unit; and
- a control unit for controlling receive channels of said parent subscriber terminal unit and said child subscriber terminal unit based on a desired receive channel of said parent subscriber terminal unit determined by said command analyzing unit and a desired receive channel of said child subscriber terminal unit indicated by said channel command signal.

12. The information receiving system according to claim 8, wherein said control means comprises:
- a determining unit for determining whether a pay channel is receivable by one of said parent subscriber terminal unit and said child subscriber terminal unit based on a present receive channel of said parent subscriber terminal unit, a present receive channel of said child subscriber terminal unit, and the position of the switching means.

13. The information receiving system according to claim 8, wherein said control means causes a corresponding display unit to display a message that indicates that a pay channel cannot be received when the determining unit determines that a desired pay channel of one of said parent subscriber terminal unit and said child subscriber terminal unit is being received by the other subscriber terminal unit of the same subscriber.

14. The information receiving system according to claim 9, wherein the determining unit of said control means determines whether or not a pay channel is being received based on a present receive channel received by the parent unit side television tuner and a present receive channel received by the child unit side television tuner.

15. The information receiving system according to claim 12, wherein the determining unit of said control means determines whether or not a pay channel is being received based on a present receive channel received by the parent unit side television tuner and a present receive channel received by the child unit side television tuner.

* * * * *